United States Patent [19]
Fishman et al.

[11] Patent Number: 5,742,260
[45] Date of Patent: Apr. 21, 1998

[54] SYSTEM AND METHOD FOR TRANSFERRING DATA USING A FRAME-SCANNING DISPLAY DEVICE

[75] Inventors: Neil S. Fishman, Bothell; J. Mark Miller, Kirkland, both of Wash.; Thomas J. Dvorachek, III, Kensington, Conn.

[73] Assignee: Microsoft Corporation, Redmond, Wash.

[21] Appl. No.: 447,012

[22] Filed: May 22, 1995

[51] Int. Cl.⁶ .................................................. G09G 5/00
[52] U.S. Cl. ........................ 345/2; 345/1; 364/705.7; 370/509; 370/510
[58] Field of Search .................. 345/1.2, 14; 370/105.1, 370/105.4, 513, 509, 510

[56] References Cited

U.S. PATENT DOCUMENTS

| | | | |
|---|---|---|---|
| 4,534,012 | 8/1985 | Yokozawa | 364/900 |
| 4,663,766 | 5/1987 | Bremer | 375/13 |
| 4,999,617 | 3/1991 | Uemura et al. | |
| 5,007,088 | 4/1991 | Ooi et al. | 370/105.1 |
| 5,299,236 | 3/1994 | Pandula | 370/513 |
| 5,321,754 | 6/1994 | Fisher et al. | 380/48 |
| 5,488,571 | 1/1996 | Jacobs et al. | 364/705.07 |
| 5,550,556 | 8/1996 | Wu et al. | 345/14 |

Primary Examiner—Richard Hjerpe
Assistant Examiner—Kent Chang
Attorney, Agent, or Firm—Lee & Hayes, PLLC

[57] ABSTRACT

The invention encompasses a system and method for serially transferring a sequence of data bits having binary values. This includes a step of displaying sequential display frames on a frame-scanning graphics display device, wherein each sequential display frame is associated with an individual group of data bits. Each group of data bits is associated with one or more data framing bits. The framing bits are inverted from one sequential display frame to the next. Within each display frame, sequentially-scanned data transmission lines are selectively illuminated to represent the individual groups of data bits associated with the display frames and their associated data framing bits. Bits having a first binary value are represented by illuminated display frame lines. Bits having a second binary value are represented by non-illuminated display frame lines. A receiving device can determine the validity of a particular display frame by determining whether the framing bits of the display frame are inverted from the framing bits of the previous display frame. Further aspects of the invention provide error detection and correction capabilities, and also provide methods of making the most efficient utilization of the data transfer mechanism.

22 Claims, 5 Drawing Sheets

SYSTEM AND METHOD FOR TRANSFERRING DATA USING A FRAME-SCANNING DISPLAY DEVICE

TECHNICAL FIELD

The invention relates to methods and systems for serially transmitting digital data using a frame-scanning display device such as a cathode ray tube and to the detection and correction of data transmission errors in such methods and systems.

BACKGROUND OF THE INVENTION

In recent years, there has been an increasing use of compact, pocket-size electronic personal organizers that store personal scheduling information such as appointments, tasks, phone numbers, flight schedules, alarms, birthdays, and anniversaries. Some of the more common electronic organizers are akin to handheld calculators. They have a full input keyboard with both numeric keys and alphabet keys, as well as special function keys. The organizers also have a liquid crystal display (LCD) which often displays full sentences and rudimentary graphics.

Pocket-size personal organizers prove most useful to busy individuals who are frequently traveling or always on the move from one meeting to the next appointment. Unfortunately, due to their hectic schedules, these individuals are the people most likely to forget their personal organizers during the frantic rush to gather documents, files, laptops, cellular phones, and travel tickets before heading off to the airport or train depot. It would be desirable to reduce the number of electronic devices that these individuals need to remember for each outing.

Electronic watches have evolved to the point that they can function as personal organizers. Like the pocket-size devices described above, such watches can be programmed with certain key appointments, tasks, phone numbers, flight schedules, alarms, birthdays, and anniversaries. Since watches are part of everyday fashion attire, they are more convenient to carry and less likely to be forgotten by busy people. However, it is much more difficult to enter data into a watch than it is to enter the same data into a pocket-size personal organizer. This difficulty is due in large part to the limited number of input buttons and display characters available on reasonably-sized watches. Most watches are limited to having only three or four input buttons. A wearer programs a watch by depressing one or more buttons several times to cycle through various menu options. Once an option is selected, the user depresses another button or buttons to input the desired information. These input techniques are inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

Apart from personal organizers, it is common for many people to maintain appointment calendars and task lists on their personal computers. One example time management software is Microsoft's® Schedule+™ for Windows® which maintains daily appointment schedules, to-do lists, personal notes, and calendar planning. This information is often a duplicate of that maintained on the portable personal organizer.

Timex Corporation of Middlebury, Conn., has recently introduced the Timex® Data-Link™ watch. This watch utilizes new technology for transferring information from a personal computer to a watch. This system is more fully disclosed and described in U.S. patent application Ser. No. 08/155,326 filed Oct. 22, 1993, in the names of Jacobs and Insero and assigned to Timex Corporation. The face of the watch has an optical sensor which is connected to a digital serial receiver, better known as a UART (universal asynchronous receiver/transmitter), which is incorporated into an integrated circuit controlling the time-keeping functions of the watch. The watch expects to receive a serial bit transmission in the form of light pulses at a fixed bit rate. A pulse represents a binary '0' bit, and the absence of a pulse represents a binary '1' bit.

The CRT (cathode ray tube) or other scanned-pixel display of a personal computer is used to provide light pulses to the watch. Although it appears to a human viewer that all pixels of a CRT are illuminated simultaneously, the pixels are actually illuminated individually, one at a time, by an electron beam which sequentially scans each row or raster line of pixels beginning with the top raster line and ending with the bottom raster line. It is this characteristic of a CRT and of other scanned display devices which is utilized to transmit serial data to the Data-Link™ watch.

To transfer data to the watch, the watch is held near and facing the CRT. The computer is programmed to display a sequence of display frames in which spaced data transmission raster lines represent individual bits of data. Lines are illuminated or not illuminated, depending on whether they represent binary '0' bits or binary '1' bits. Each line appears as a continuous pulse of a finite duration to the receiving watch. The watch recognizes an illuminated line as a binary '0' bit. It recognizes a non-illuminated line as a binary '1' bit. Generally, ten bits are transmitted in a single CRT display frame: eight data bits, a start bit, and a stop bit. This represents a single byte of data. It is also possible to transmit plural bytes in a single CRT display frame. As used herein, the term "display frame" means a single screen-size image made up of a matrix of pixels. A display frame is generally created by sequentially illuminating or refreshing the pixels of the display device.

Most popular personal computers use bit-mapped graphics displays in which the color or other illumination characteristics of each displayed pixel are represented by data residing in the computer's DRAM memory. This memory is referred to as a frame buffer, and has a plurality of individual storage locations corresponding respectively to the individual pixels of the CRT display. To transmit data to the Data-Link™ watch from a computer such as this, it is necessary to establish the appropriate data in the frame buffer for sequential display frames. The Data-Link™ watch is programmed to expect a new data byte for every subsequent display frame, so the personal computer must rewrite the display memory between every frame refresh. This rewriting is normally done during the "vertical retrace" period of the display device-the period between refresh cycles. In a CRT, this is the period during which the electron beam is returning from the bottom to the top of the screen.

It is very important that the software performing this task make all required changes in the frame buffer during the appropriate periods between refresh cycles. If the software is slow, and allows the same display frame to be displayed twice, the receiving watch will erroneously receive the same byte two times. If the software begins but does not complete its display frame rewriting before the next refresh cycle, the resulting display frame will be erroneous. However, the receiving watch will mistakenly interpret the display frame as valid data.

These timing requirements have been surmountable in current versions of the software designed to support the Data-Link™ watch. Under currently popular operating systems such as MS-DOS and Microsoft Windows®, application soft-ware is able to interact very closely with peripheral hardware such as CRT control circuits. The application software is also able to ensure, to a very large degree, that it is not interrupted by other processes during critical timing periods.

Newer multi-tasking operating systems such as Microsoft Windows NT® and Microsoft Windows 95™, however, will make it much more difficult for application software to meet the timing requirements described above. These operating systems discourage close interaction between an application program and a computer's hardware devices. Such operating systems also implement a version of multi-tasking which makes it difficult for an application program to ensure that it will have exclusive control of a computer at any specific time.

To run reliably under these newer multi-tasking operating systems, it would be desirable to be able to transfer information to the Data-Link™ watch with relaxed timing requirements.

SUMMARY OF THE INVENTION

The invention described below relaxes the timing requirements described above. This is accomplished by providing one or more framing bits in each sequential display frame. The framing bits are inverted from one display frame to the next. This allows a receiving device to detect and discard duplicate display frames. Furthermore, at least a selected one of the framing bits in each display frame is written after all other bits of the display frame. Because of this, a receiving device can determine whether a particular display frame has been only partially written by checking whether the selected framing bit has been inverted since the previous display frame. Further aspects of the invention provide error detection and correction capabilities, and also provide methods of making the most efficient utilization of the data transfer mechanism.

BRIEF DESCRIPTION OF THE DRAWINGS

The same reference numerals are used throughout the disclosure to reference like components and features.

DETAILED DESCRIPTION OF THE PREFERRED EMBODIMENT

Figure 1:
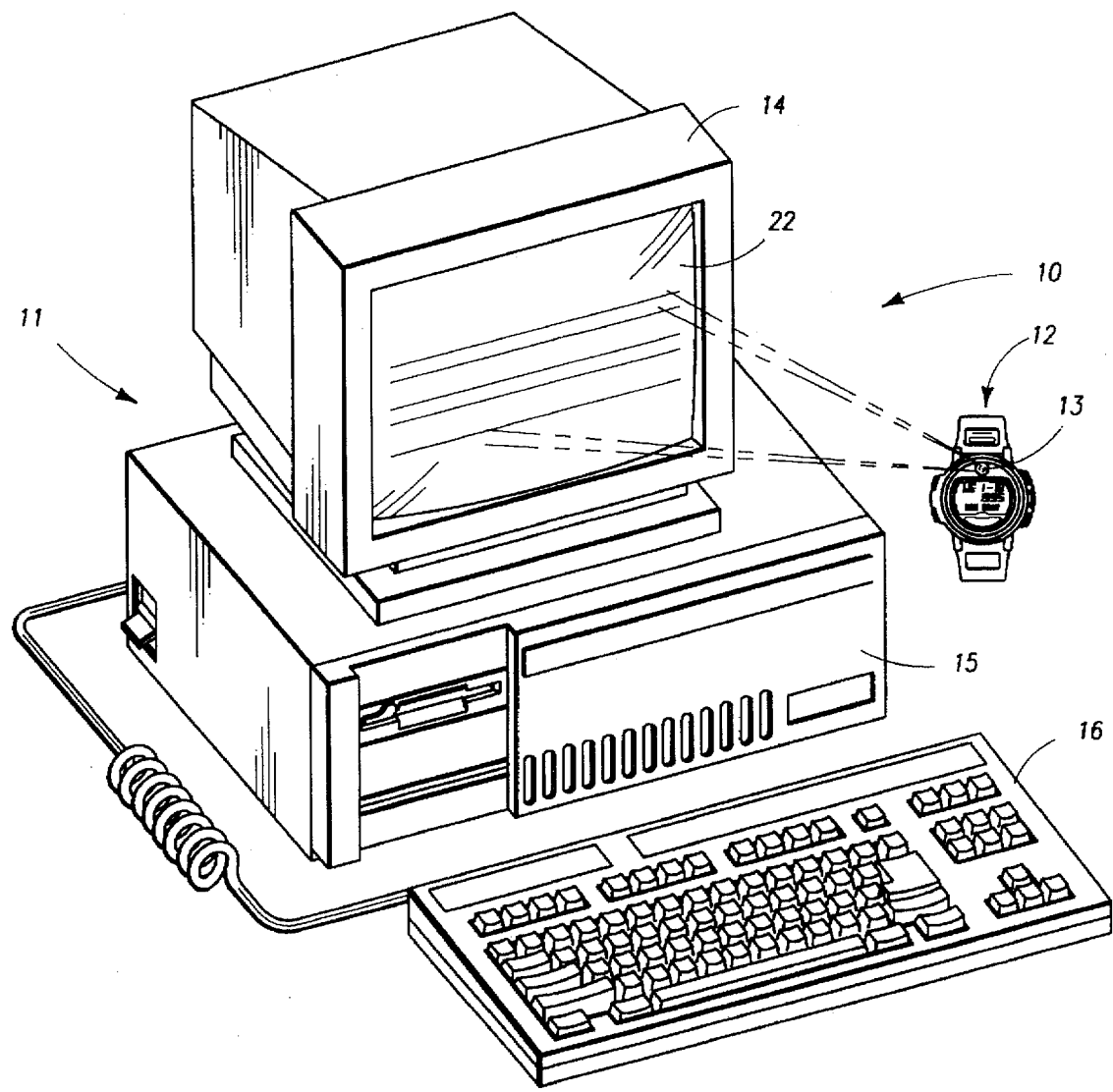
FIG. 1 is a diagrammatic illustration of a system for serially transferring data to a programmable watch from a desk-top computer according to one embodiment of this invention.

FIG. 1 shows a personal electronic time management system 10 according to one embodiment of this invention. Time management system 10 includes a computer or computer system 11 and a portable information receiving device in the form of programmable watch 12. A data transmission interface is provided to enable computer system 11 to program watch 12 by transferring programming information thereto. In the preferred embodiment, the computer and watch are interfaced via an optical coupling.

In the illustrated embodiment, watch 12 has an optical sensor 13. Computer system 11 remotely programs watch 12 by optically transmitting a serial stream of data that can be detected and deciphered by watch 12. The preferred embodiment of this invention involves a programmable watch, such as the commercially available Timex® Data-Link™ watch, which can be configured to function as a portable personal time manager. Accordingly, the invention is described herein within the context of a programmable watch. However, other forms of portable information devices can be used, such as pagers and personal digital assistants (PDAs). As used herein, "portable information device" means a small, portable, electronic apparatus that has limited power resources and limited rewritable memory capacity. The Data-Link™ watch, for example, is presently constructed with a rewritable memory capacity of approximately 1 Kbyte.

Figure 2:
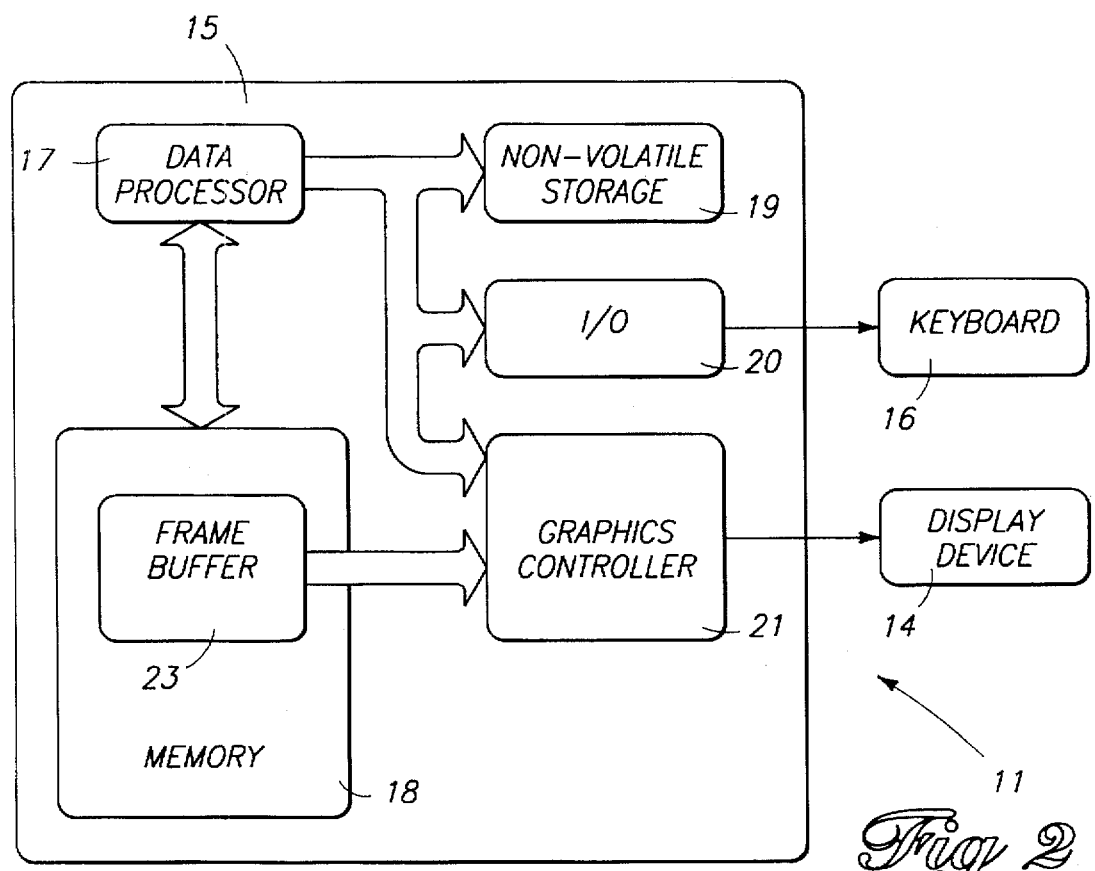
FIG. 2 is a block diagram of a computer which forms part of the system of FIG. 1.

Computer 11 includes an associated frame-scanning graphics display device 14, a central processing unit (CPU) 15 having a processor, memory, and I/O components, and a keyboard 16 (or other input device). These components and other internal components of CPU 15 are shown in FIG. 2. As shown, CPU 15 includes a data processor 17 and associated memory 18. CPU 15 also includes non-volatile storage 19 such as a hard disk, general I/O circuits 20 for interfacing with keyboard 16, printers (not shown) and other devices, and a graphics controller 21 which interfaces display device 14 with CPU 15. The illustrated computer system is an IBM®-compatible system, although other architectures, such as Apple®-compatible systems, can be employed.

Visual display device 14 is preferably a CRT (Cathode Ray Tube) monitor such as commonly used in personal computers. Other types of frame-scanning visual display devices, which emit high-speed light transmissions, could also be used. The graphics display device displays sequential display frames containing graphical images on its monitor screen 22. A "display frame" or "frame" means a single, two-dimensional, screen-size image made up of a matrix of pixels. The frames are normally displayed successively at an effective rate so that they appear visually static or constant on the monitor screen 22, rather than flickering. One type of conventional CRT monitor operates at 60 Hz, meaning that the monitor screen 22 is refreshed once every ¹/₆₀ or 0.01667 second. In contrast, the human eye only begins to perceive a non-constant flickering at a much slower frequency of about 10 Hz.

As discussed above, the pixels of a CRT are illuminated individually by an electron beam (i.e., the cathode ray) which sequentially scans each row of pixels beginning with the top row and ending with the bottom row. The beam is deflected horizontally (in the line direction) and vertically (in the field direction) to scan an area of the screen to produce a single display frame. The electron beam strikes phosphors positioned at the screen of the CRT monitor to cause them to glow. The phosphors are arranged according to a desired pixel pattern, which is customarily a matrix of rows and columns. Conventional color VGA monitors have a resolution of 640×480 pixels.

As in most modern personal computer systems, the displayed matrix of display frame pixels is specified by a corresponding matrix of data values stored within the memory 18 of CPU 15. The specific area of memory 18 designated for storing pixel information is referred to as a frame buffer, and is referenced in FIG. 2 by the numeral 23. Frame buffer 23 is associated with the frame-scanning graphics display device, having individual pixel storage locations corresponding respectively to individual display frame pixels. Graphics controller 21 reads pixel information from frame buffer 23 during each CRT scan to determine the color and intensity of each display frame pixel. Data processor 17 writes to frame buffer 23 to display desired or specified patterns on CRT 14.

The linear scanning electron beam of CRT 14 is utilized to transmit serial data to programmable watch 12. Software loaded in CPU 15 generates a sequence of display frames having changing optical patterns that is displayed on the CRT monitor 14. Watch 12, through optical sensor 13, monitors the illumination of the sequential display frames to receive and reconstruct the transmitted data. Preferably, the optical patterns presented on the display frames consist of sets of parallel, horizontal, sequentially-scanned data transmission raster lines that traverse across screen 22. The lines appear at optical sensor 13 as serial data. Watch 12, through optical sensor 13, monitors the illumination of the sequentially-scanned data transmission lines of the sequential display frames to decode the transmitted data. Each display frame depicted on the screen includes one or more lines which represent respective groups of data bits that comprise programming information used to program watch 12.

Figure 3:
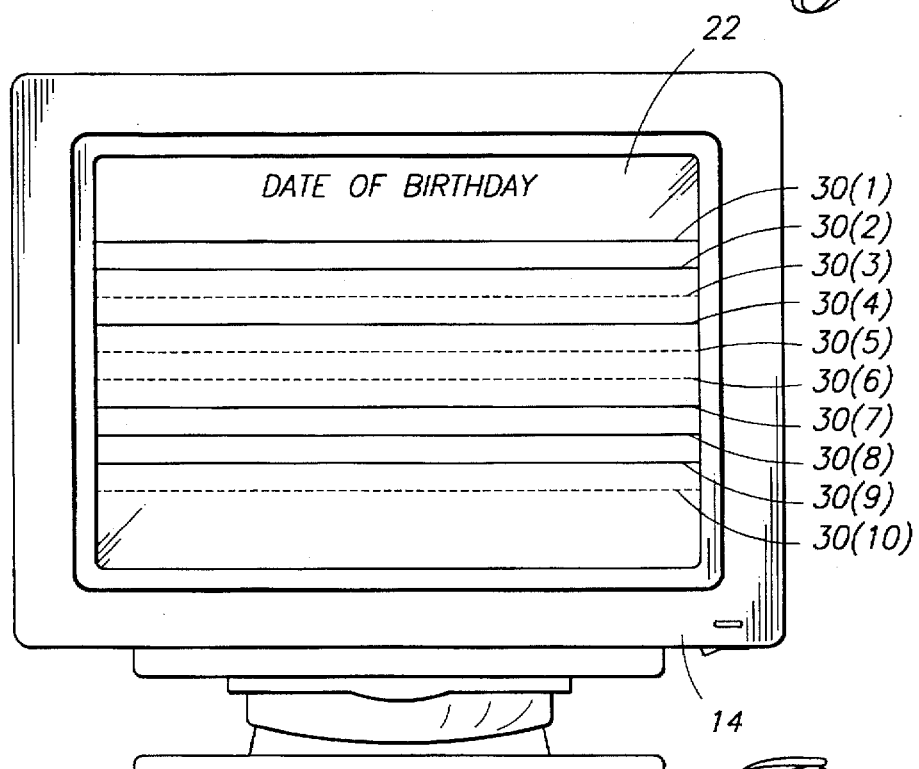
FIG. 3 is diagrammatic front view of a CRT monitor depicting a display frame having sequentially-scanned raster lines used to convey bits of information to the programmable watch.

FIG. 3 shows a one such optical pattern in more detail. Assuming that each frame transmits a single 8-bit byte with start and stop bits, a frame contains a possible ten sequentially-scanned raster lines 30(1)–30(10) which are selected for transmitting data. These raster lines will be referred to herein as "data transmission raster lines," as opposed to other, intervening, non-illuminated raster lines which will be referred to as "unused raster lines." Solid lines in FIG. 3 represent data transmission raster lines which are illuminated. Dashed raster lines in FIG. 3 represent data transmission raster lines which are not illuminated. Each data transmission raster line position conveys one data bit of information. Bits having a first binary value, such as a value '0', are represented by illuminated data transmission lines (e.g., lines 30(1), 30(2), 30(4), and 30(7)–30(9)) and bits having a second binary value, such as a value '1', are represented by non-illuminated data transmission lines (as illustrated pictorially by the dashed lines 30(3), 30(5), 30(6), and 30(10)). The lines are spaced at selected intervals, with intervening unused or non-selected raster lines, to produce a desired temporal spacing appropriate for the data receiving electronics of watch 12. The line spacing effectively establishes the transmitted bit rate. To scan an entire horizontal line, the electron beam of the CRT monitor is pulsed for a sufficient duration that it can be detected by optical sensor and associated electronics. In contrast to more conventional serial bit transmission in which '0' and '1' bits are represented by voltage levels, watch 12 is programmed to respond to an edge-based signal. Accordingly, the electron beam of the CRT does not need to be "on" for an entire bit transmission period. The watch has internal conversion circuitry which detects the rising edge from optical sensor 13 created by a single horizontal illuminated scan of the CRT, and which in response produces a level-based signal appropriate for reception by a conventional UART (universal asynchronous receiver/transmitter).

For each programming instruction or data to be transmitted to the watch, the software resident in the CPU 15 causes the CRT monitor 14 to selectively illuminate the appropriate horizontal lines representing '0' bits by scanning the associated rows of pixels. The horizontal lines that represent '1' bits are left non-illuminated. The middle eight lines 30(2)–30(9) represent one byte of programming information being optically transmitted to watch 12. Top line 30(1) represents a start bit and bottom line 30(10) represents a stop bit that are used for timing and error detection. Because of the scanning nature of the cathode ray of CRT monitor 14, these patterns produce a serial light emission from CRT monitor 14 which is representative of a serial bit stream. Each display frame represents one byte. A new line grouping is presented for each sequential display frame so that each such display frame represents a different data byte.

Figure 4:
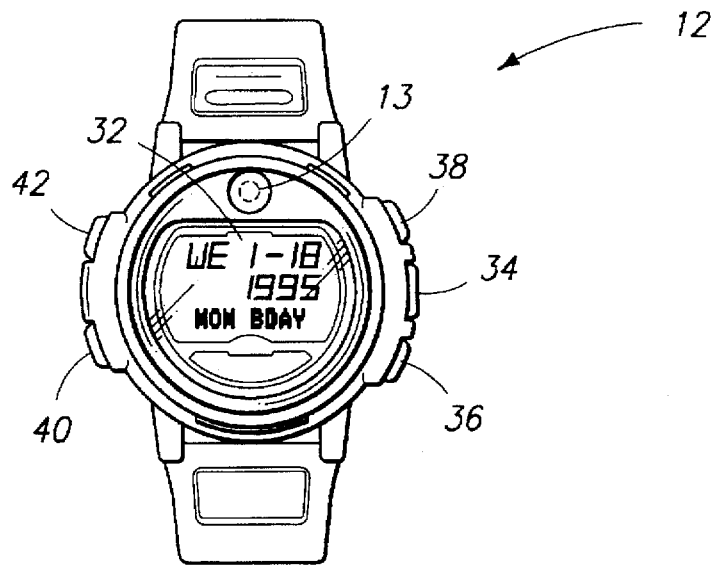
FIG. 4 is a diagrammatic front view of the programmable watch of FIG. 1.
Figure 5:
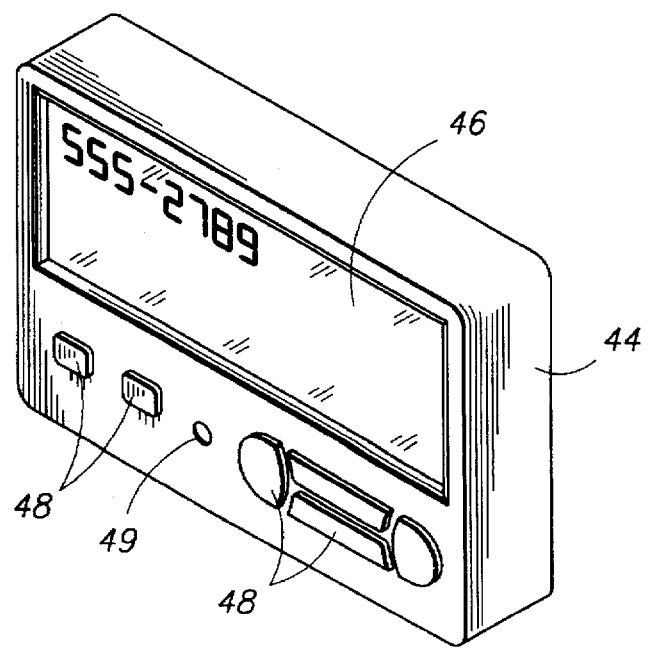
FIG. 5 is a diagrammatic front view of a programmable portable information device according to another construction of this invention.

FIG. 4 shows an external face of the programmable watch 12, which is illustrated for discussion purposes as the Timex® Data-Link™ watch. It is noted that other watch constructions as well as other portable information devices can be used in the context of this invention. Watch 12 includes a small display 32 (such as an LCD), a mode select button 34, a set/delete button 36, next/previous programming buttons 38 and 40, and a display light button 42. Optical sensor 13 is positioned adjacent to display 32. In the programming mode, display 32 indicates the programming option, and what data is being entered therein. During the normal operational mode, display 32 shows time of day, day of week, or any other function common to watches. FIG. 5 shows an alternative embodiment of a portable information device 44 of this invention in the form of a pager or personal digital assistant (PDA). Device 44 has an LCD 46, a keypad 48 for entering data, and an optical sensor 49. Like watch 12, device 44 can be optically programmed from a visual display device, such as a scanned-pixel monitor. For description purposes, the invention continues to be described in the context of the watch embodiment.

Figure 6:
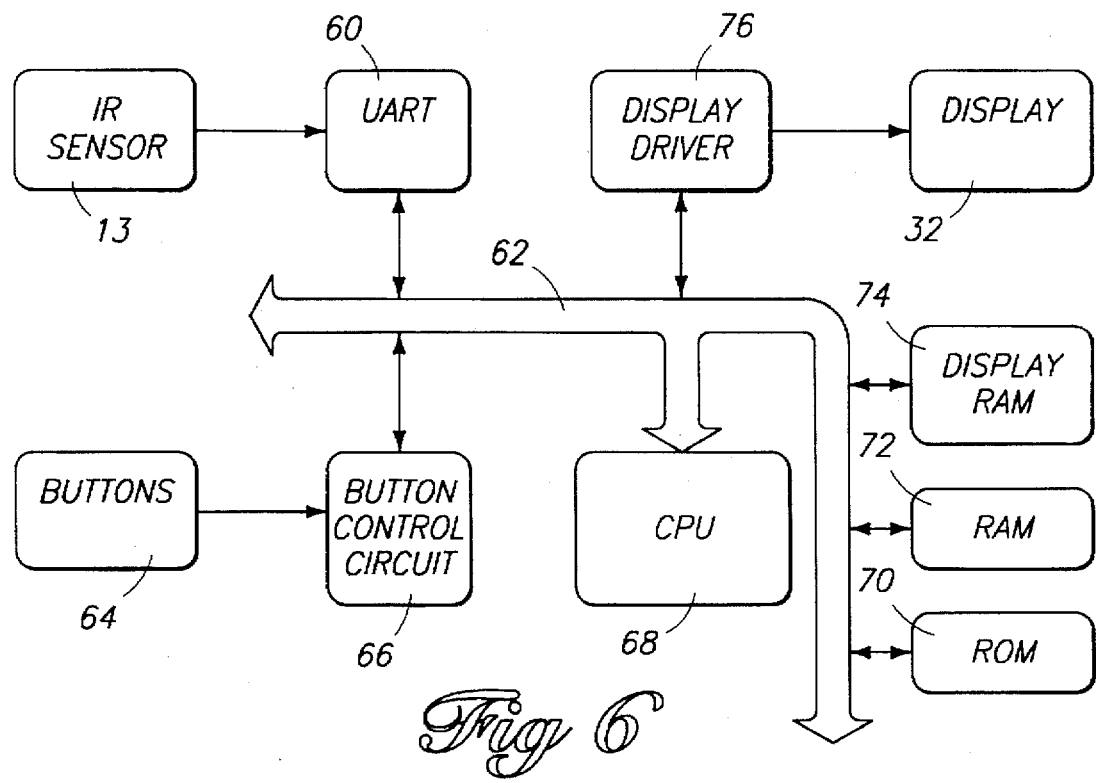
FIG. 6 is a block diagram of an electronic configuration of the programmable watch of FIG. 1.

Referring now to FIG. 6, light sensor 13 of watch 12 is coupled to a digital serial receiver or UART 60. UART 60 may be a conventional, off-the-shelf circuit which receives data in eight-bit words surrounded by start and stop bits. The UART decodes the optical patterns to extract the data bits transmitted from the computer. As discussed above, watch 12 includes conversion circuitry (not shown) to produce a level-based serial signal from the edge-based signal generated by computer 11. The UART is coupled to an internal bus 62, which is preferably an eight-bit bus. Inputs received from the control buttons on the watch, referenced generally by box 64, are detected and deciphered by button control circuit 66 and placed on bus 62. The watch also includes a CPU (Central Processing Unit) 68 for performing the data processing tasks, a ROM (Read Only Memory) 70 for storing initial power-up programs and other identification information, and a RAM (Random Access Memory) 72 for data storage. ROM 70 has an example capacity of approximately 16 Kbytes, while RAM 72 has an example capacity of 1 Kbyte. A display RAM 74 is provided to temporarily store data used by display driver 76 to depict visual information on display 32. These components, including the UART circuit, are preferably incorporated into a single microprocessor-based integrated circuit. One appropriate microprocessor IC is available from Motorola Corporation as model MC68HC05HG.

To program the watch, the computer is first loaded with a compatible time management software and optical pattern generating software. One example time management software is Microsoft's® Schedule+™ for Windows® and a suitable optical pattern generating software is Timex® Data-Link™ communications software. The user selects a desired option from a menu of choices displayed on the monitor in a human-intelligible form. For instance, suppose the user wants to enter his/her appointments and tasks for the month of January, including a reminder for his/her mother's birthday on Jan. 18, 1995. The user inputs the scheduling information on the computer using a keyboard and/or mouse input device. The user then sets the watch to a programming mode using control buttons 34-40 and holds optical sensor 13 facing monitor screen 22. A sequence of changing optical patterns having horizontal sequentially-scanned data transmission lines begin to flash across the monitor screen as shown in FIG. 3 to optically transmit data regarding the various appointments and tasks. In about 20 seconds, the system will have transmitted as many as 70 entries, including the birthday reminder. These entries are kept in data RAM 72.

The data transfer methods described above have been adequate in most situations. However, difficulties arise when attempting to assert frame-by-frame display control in true multi-tasking operating systems. While such operating systems are not currently in wide-spread use, they soon will be. In a true multi-tasking environment, no single application program can assume that it will be able to run uninterrupted. Rather, the operating system will periodically interrupt a first program to allow a second program to run. Control is passed quickly from one application program to another, giving the impressions that all programs are running simultaneously. This passing of control makes it difficult for an application program to ensure that it will be able to write the display frame buffer between every screen refresh. There is, in fact, a good chance that the application program will not be active during this precise time. The preferred embodiment of the invention solves this problem by eliminating the requirement of writing the screen between every screen refresh.

Figure 7:
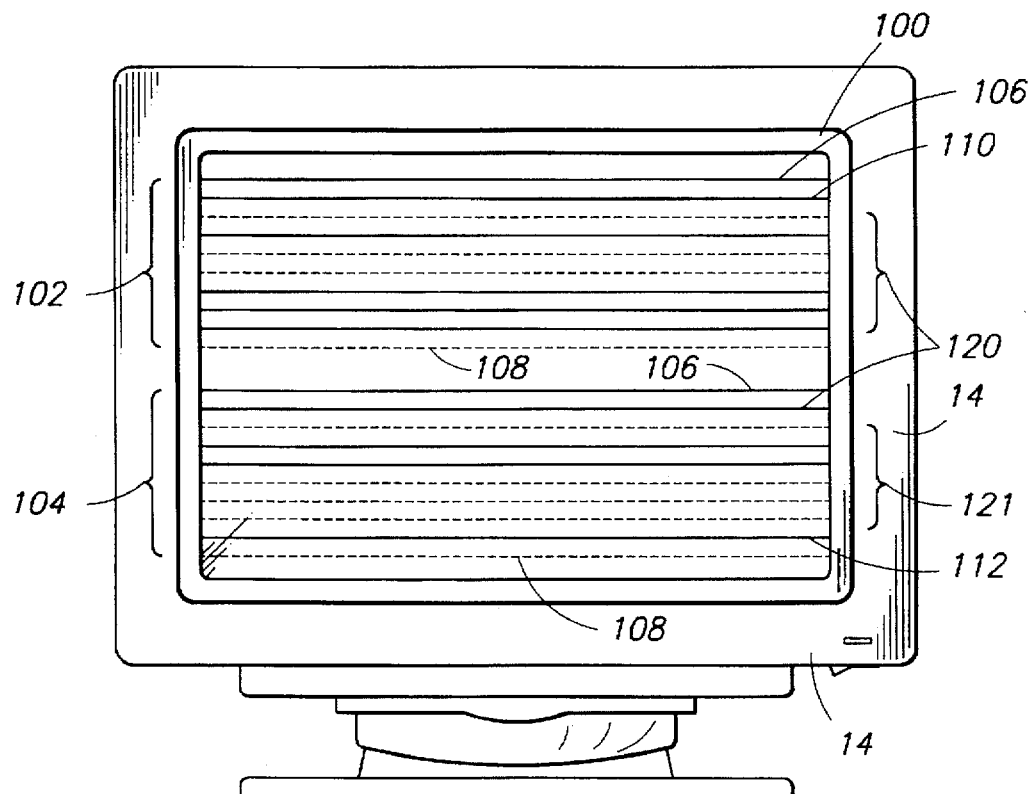
FIG. 7 is a diagrammatic front view of a CRT monitor similar to the view of FIG. 3, illustrating the transmission of framing bits in accordance with the invention.

FIG. 7 shows a display frame 100 in accordance with a preferred embodiment of the invention. Display frame 100 is similar to that shown in FIG. 3. However, display frame 100 contains information which allows watch 12 to determine when it has received a duplicate display frame or when it has received a display frame which has only been partially written. With this information, the watch can discard these types of display frames. Using this technique, the application program of computer 11 need only ensure that data is presented for at least one display frame. This requirement is very easy to meet even under a multi-tasking operating system.

Specifically, display frame 100 includes leading and trailing display frame words or bytes 102 and 104, each of which is associated with its own start and stop bits 106 and 108 as discussed above. Display frame 100 also includes one or more framing bits. In the preferred embodiment, each display frame includes a pair of framing bits 110 and 112 positioned in leading and trailing positions within the individual words of display frame 100. For instance, a first framing bit 110 is positioned as the leading data bit of leading display frame word 102. A second framing bit 112 is positioned as the trailing data bit of trailing display frame word 104. When two framing bits are used as shown, they are set within each display frame so that they have a predetermined binary relationship to each other. For instance, in the preferred embodiment, the two framing bits of each frame are equal to each other: when first framing bit 110 is a logical '1', second framing bit 112 is also a logical '1'; when first framing bit 110 is a logical '0', second framing bit 112 is also a logical '0'. Alternatively, the framing bits could be specified to always be opposite to each other within any valid display frame: when first framing bit 110 was a logical '1', second framing bit 112 would be a logical '0'; when first framing bit 110 a logical '0', second framing bit 112 would be a logical '2'.

Computer 11 is programmed to change or invert the framing bits for each sequential display frame. For instance, in a first frame, both of the two illustrated framing bits might be equal to binary '1'. In the next display frame, both framing bits would be equal to binary '0'. Furthermore, the data transmission line representing a selected one of the framing bits within each display frame is written to frame buffer 23 only after all other data transmission lines of the display frame have already been written to the frame buffer. When a pair of framing bits are used, the data transmission line representing the leading framing bit is written first, and the data transmission line representing the trailing framing bit is written last. If only a single framing bit is used within each display frame, it is positioned as a leading bit with respect to other bits within the display frame, and its corresponding data transmission line is written to the frame buffer only after all other data transmission lines have been written.

In combination, these techniques eliminate the previous requirement that computer 11 completely write its frame buffer 23 between each display frame refresh. In accordance with the invention, watch 12 can discard any received data from a particular display frame if either (a) the framing bits of the particular display frame do not correspond to each other or (b) the framing bit or bits of the particular display frame are not changed or inverted from the framing bit or bits of the previous display frame. Framing bits within a pair which do not correspond to each other indicate a display frame which has not been completely written. This conclusion assumes that the computer is programmed to write its frame buffer from top-to-bottom or bottom-to-top so that writing begins with one framing bit and ends with the other. A framing bit pair which is not inverted from the pair of the previous display frame indicates that the current display frame is a repeat of the last display frame. When using a single framing bit in each display frame, the detection of a repeating framing bit value from one display frame to the next indicates either that the latter display frame is a duplicate of the former or that the latter display frame has only been partially written. In either case, the transmitted data is invalid.

The general methodical steps of the invention, implemented by CPU 15 and programmed data processor 17, include displaying sequential display frames on CRT 14. Each display frame is associated with an individual group of data bits to be transferred from computer 11 to watch 12. The methodical steps of the invention further include associating at least one data framing bit, and preferably a pair of data framing bits, with each group of data bits. When pairs of framing bits are used, the bits of each pair have a predetermined binary relationship to each other. A further step includes selectively illuminating sequentially-scanned data transmission lines within the display frames to represent the individual groups of data bits associated with the display frames and the associated data framing bits. Bits having a first binary value are represented by sequentially-scanned data transmission display frame lines which are illuminated.

Bits having a second binary value are represented by sequentially-scanned data transmission display frame lines which are not illuminated.

The methodical steps of the invention further include changing or inverting the binary values of the framing bits from one sequential display frame to the next. Watch 12 performs additional steps of discarding the data bits of a particular display frame if the framing bits of the display frame do not correspond to each other in the predetermined way or if a framing bit of the particular display frame is not inverted from the corresponding framing bit of the previous display frame.

The result of these steps is illustrated in FIG. 7, which shows the data bits of a single data word, designated by reference numeral 120. Notice that the steps described above result in data word 120 being split between the two display frame words. This is necessary to leave open bit positions for data framing bits 110 and 112. Leading display frame word 102 contains seven bits of data word 120. Trailing display frame word 104 contains the remaining bit of data word 120. In this example, pairs of data framing bits are used and six display frame word bits are unused.

Figure 8:
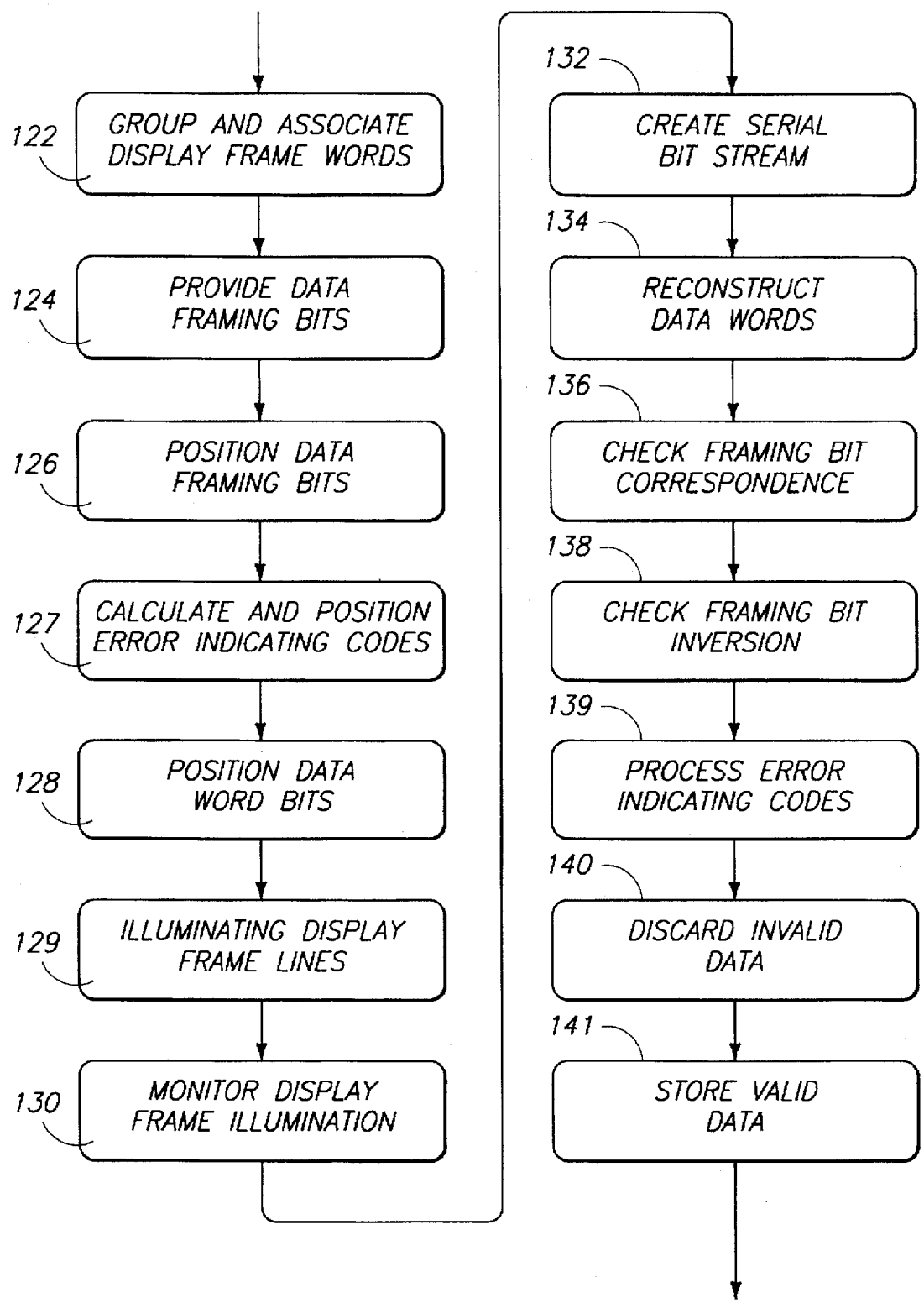
FIG. 8 is a flow diagram of a method comprising preferred steps for transferring data in accordance with the invention.

More detailed methodical steps in accordance with the invention are shown generally in FIG. 8. Because watch 12 utilizes a conventional and off-the-shelf UART, it expects to receive data in 8-bit words (bytes). Accordingly, data must be transmitted in byte-sized words, each of which is surrounded by a start bit and a stop bit. These words are referred to herein as "display frame words." The bits of the display frame words have binary values and are referred to as "display frame word bits." The data to be transmitted to watch 12 is likewise arranged in words within both computer 11 and watch 12. These words are referred to herein as "data words" to distinguish them from the display frame words. The bits of data words have binary values and are referred to as data bits or "data word bits." As a result of utilizing bits within the display frame words as framing bits, there is not necessarily a one-to-one correspondence between the display frame word and the data words.

Steps 122 through 129 are performed by the transmitting computer 11. Step 122 comprises grouping display frame words and associating the groups of display frame words with respective sequential display frames. In FIG. 7, two display frame words (102 and 104) are associated with each sequential display frame (only a single display frame is shown). However, it might in many cases be desirable to associate groups of three or more display frame words with each sequential display frame.

Step 124 comprises providing at least one, and preferably a pair, of data framing bits for each respective group of display frame words. The bits of each data framing bit pair have binary values which correspond to each other. In the preferred embodiment, the bits of each pair are equal to each other. The bits of each pair could alternatively be specified to be opposite to or inverted from each other.

Step 126 comprises positioning the data framing bits of each pair in leading and trailing positions in their respective display frame word groups. A first of the data framing bits is positioned as the leading bit of the leading display frame word of the display frame word group. A second of the data framing bits is positioned as the trailing bit of the trailing display frame word of the display frame word group.

An optional step 127 includes calculating error indicating codes and positioning them in otherwise unused bit positions of the display frame word groups between the data framing bits. The calculation and use of such error indicating codes will be described in more detail below.

Step 128 comprises positioning bits of data words in the display frame words of the display frame word groups between the data framing bits. This often includes dividing the bits of a particular data word between at least two display frame words to leave open bit positions for the data framing bits.

A step 129 comprises selectively illuminating sequentially-scanned data transmission display frame lines of display device 14 to represent the bits of each sequential display frame's associated display frame word group.

Steps 130 through 141 are performed by a receiving device such as watch 12, include a step 130 of optically monitoring the illumination of the sequentially-scanned data transmission lines of the sequential display frames. This is preferably accomplished with the watch/portable information device hardware described above. A step 132 includes creating a serial bit stream in response to monitoring the illumination of the sequentially-scanned data transmission lines of the sequential display frames. Step 134 comprises decoding or reconstructing the data words from the serial bit stream.

A further step 136 comprises checking to ensure that paired data framing bits of a particular display frame have the predetermined binary relationship to each other. An additional step 138 comprises checking to ensure that the data framing bits of a particular received display frame are inverted from the data framing bits of the previous display frame. An optional step 139 comprises processing an error indicating code embedded in the display frame words as further explained below. A step 140 comprises discarding data words as a result of detecting data transmission or reception errors during steps 136 or 138, or declaring a data reception error based upon step 139 of processing the error indicating code. A step 141 comprises storing valid data (as indicated by correct data framing bits) into the watch's data storage or program execution memory.

In accordance with the invention, computer 11 must only ensure that each sequential display frame is present for at least one screen refresh. In some systems, it may be desirable to ensure that each display frame is present for at least two or more screen refreshes. This would allow a receiving device multiple opportunities to receive the data from each display frame.

As a further, optional, enhancement and verification tool, computer 11 is programmed in step 127 to associate consecutive frame numbers with the sequential display frames. To implement this step, each frame number is represented by a plurality of binary frame number bits which are positioned in otherwise unused bit positions of a corresponding display frame word group. For instance, frame number bits are positioned in bits 121 of FIG. 7. Step 129 includes illuminating lines within each display frame to represent the frame number bits associated with that display frame. Step 139 includes reconstructing the frame numbers from the received serial bit stream and declaring a data reception error if the frame numbers are not consecutively received. These steps allow watch 12 to detect when it has missed a display frame. Without frame numbers, missing a display frame would cause watch 12 to receive two display frames with non-inverted framing bits. In this case, watch 12 would simply ignore the second display frame and wait for a framing bit inversion-in effect compounding the error and causing watch 12 to miss the data from two display frames. Frame numbers allow the watch to detect the error immediately.

As a further or alternative error-detecting feature of the invention, computer 11 is programmed in step 127 to calculate or derive an error indicating code from the data words of the display frames. This code comprises a plurality of binary error indicating bits which are positioned in the display frame word groups between the data framing bit pairs. The error indicating code might be simply an error detection code such as a CRC (cyclic redundancy checking) code or checksum to allow watch 12 to declare a data reception error in step 139 if it received garbled data. Alternatively, the error indicating code might be an error correction code such as a Hamming code which would allow watch 12 to correct any data bits which were erroneously received.

In accordance with this feature of the invention, computer 11 is programmed to position the error indicating bits in the display frame words between data framing bit pairs. One possibility would be to calculate a single error indicating code for each display frame based upon that display frame or data words of only that display frame. Another possibility would be to derive a single error indicating code from the data word bits of a plurality of the display frame word groups, and to distribute the binary bits of the single error indicating code in the display frame words of said plurality of display frame word groups between their respective data framing pairs. This distribution is particularly desirable when the error indicating code is an error detection code such as a Hamming code. Assuming that there are eight data bits in the display frame word groups of each display frame (as in FIG. 7), the six unused bits of each display frame would be sufficient to implement a Hamming code which would allow correction of single-bit errors. However, data transmission errors in the preferred embodiment of the invention are often burst or multiple-bit errors. Error correction capabilities can be improved by calculating a single Hamming code which is greater than 6 bits in length and which corresponds to the sixteen data bits contained in two consecutive display frames. The resulting Hamming code would be distributed in the unused bits of the two consecutive display frames.

In practice, it may be sufficient to use framing numbers in combination with a simple checksum rather than the error correction codes described above. This will allow detection of most burst or multiple-bit errors, and is much simpler to implement with the limited resources of watch 12.

The various components of watch 12 form decoding logic which is responsive to optical sensor 13 to decode received data bits, data framing bits, framing numbers, and error indicating codes. In reconstructing data words, the watch must combine bits from two or more display frame words. For instance, in FIG. 7 the transmitted data bit has seven bits in the first or leading display frame word 102, and an eighth bit in second or trailing display frame word 104. Because of the limited processing power of watch 12, it is desirable to reduce the number or complexity of calculations required of watch 12. In one embodiment of the invention, this is accomplished in step 128 of FIG. 8 by positioning individual data word bits at bit locations in the display frame words corresponding to the bit locations of said individual data word bits in their data words. This allows the data words to be reconstructed from the display frame words without bit shifting. For example, the two display frame words of FIG. 7 are arranged as shown in Table 1 below, wherein $Bit_x$ represents bit x of the respective display frame words, $FB_1$ and $FB_2$ are the leading and trailing framing bits, respectively, $D_x$ represents bit x of the data word contained in the display frame group, and $X_0$ through $X_5$ represent extra or unused bits 0 through 5. Bits $X_0$ through $X_5$ are unused or might be used as described above for frame number or error indication codes.

TABLE 1

| | $Bit_7$ | $Bit_6$ | $Bit_5$ | $Bit_4$ | $Bit_3$ | $Bit_2$ | $Bit_1$ | $Bit_0$ |
|---|---|---|---|---|---|---|---|---|
| First Display Frame Word | $FB_1$ | $D_6$ | $D_5$ | $D_4$ | $D_3$ | $D_2$ | $D_1$ | $D_0$ |
| Second Display Frame Word | $D_7$ | $X_5$ | $X_4$ | $X_3$ | $X_2$ | $X_1$ | $X_0$ | $FB_2$ |

As shown, each of data bits 0 through 7 are positioned at display frame word bit locations corresponding to the original bit locations of the data bits within their data words. Data word bits 0–6 are positioned as bits 0–6 of the first display frame word. The leading framing bit, however, occupies bit 7 of the first display frame word. Bit 7 of the data word is therefore positioned as bit 7 of the second display frame word. Watch 12 can therefore be programmed to reconstruct a data word from the two received display frame words with simple masking steps and without the bit shifting which might otherwise be required. Masking steps requires significantly less processing time than bit shifting steps.

Table 2 below illustrates a sub-step which forms part of step 128 of FIG. 8. This sub-step comprises interleaving the bits of the data words among a plurality of display frame words to leave open bit positions for the data framing bits. Such interleaving results in individual display frame words having bits from one or more data words. Interleaving can be performed across the display frame words of a single display frame, or across the display frame words of multiple display frames as shown in Table 2. When interleaving across multiple display frames, data can be packed to utilize all bit positions, so that there are no extra or unused bits. Table 2 shows efficient interleaving across four display frames, designated A through D. Each display frame word group is made up of two display frame words: $DFW_0$ and $DFW_1$. Multiple data words are designated D0–D6. This format can accommodate 7 data words.

TABLE 2

| | $Bit_7$ | $Bit_6$ | $Bit_5$ | $Bit_4$ | $Bit_3$ | $Bit_2$ | $Bit_1$ | $Bit_0$ |
|---|---|---|---|---|---|---|---|---|
| Display Frame A, $DFW_0$ | $FB_1$ | $D0_6$ | $D0_5$ | $D0_4$ | $D0_3$ | $D0_2$ | $D0_1$ | $D0_0$ |
| Display Frame A, $DFW_1$ | $D0_7$ | $D1_7$ | $D1_6$ | $D1_5$ | $D1_4$ | $D1_3$ | $D1_2$ | $FB_2$ |
| Display Frame B, $DFW_0$ | $FB_1$ | $D2_7$ | $D2_6$ | $D2_5$ | $D2_4$ | $D2_3$ | $D1_1$ | $D1_0$ |
| Display Frame B, $DFW_1$ | $D3_7$ | $D3_6$ | $D3_5$ | $D3_4$ | $D2_2$ | $D2_1$ | $D2_0$ | $FB_2$ |
| Display Frame C, $DFW_0$ | $FB_1$ | $D4_7$ | $D4_6$ | $D4_5$ | $D4_3$ | $D3_3$ | $D3_2$ | $D3_1$ | $D3_0$ |
| Display Frame C, $DFW_1$ | $D5_7$ | $D5_6$ | $D5_4$ | $D4_3$ | $D4_2$ | $D4_1$ | $D4_0$ | $FB_2$ |
| Display Frame D, $DFW_0$ | $FB_1$ | $D5_5$ | $D5_4$ | $D5_3$ | $D5_2$ | $D5_1$ | $D5_0$ | $D6_0$ |
| Display Frame D, $DFW_1$ | $D6_7$ | $D6_6$ | $D6_5$ | $D6_4$ | $D6_3$ | $D6_2$ | $D6_1$ | $FB_2$ |

As shown, the bits of data words D0–D6 are preferably arranged to require the least possible bit shifting during reconstruction by watch 12. This packed arrangement of the words of sequential display frames makes efficient use of all bit positions, while minimizing the processing required by receiving watch 12.

The invention described above allows data to be conveniently transmitted from computer systems which are running under true multi-tasking operating systems, in which an application is denied exclusive use of system resources. The invention also includes features which enhance error checking and correction capabilities of the data transfer system. The invention thus provides a useful improvement to previous systems of data transfer which utilize frame-scanning display devices.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of serially transmitting a sequence of data bits, the method comprising the following steps:
    displaying sequential display frames on a frame-scanning graphics display device, the sequential display frames being associated with individual groups of data bits;
    associating at least one data framing bit with each individual group of data bits;
    selectively illuminating sequentially-scanned data transmission lines within the display frames to represent the individual groups of data bits associated with the display frames and the associated data framing bits, wherein bits having a first binary value are represented by the data transmission lines which are illuminated, and wherein bits having a second binary value are represented by the data transmission lines which are not illuminated;
    changing the binary values of the framing bits associated with the individual groups of data bits from one sequential display frame to the next;
    wherein the illuminating step comprises writing the sequentially-scanned data transmission lines of the sequential display frames to a frame buffer, the data transmission line representing one of the data framing bits associated with an individual group of data bits being written only after all of the other data transmission lines of a particular display frame have been written.

2. A method as recited in claim 1, wherein the changing step comprises inverting the binary values of the framing bits associated with the individual groups of data bits from one sequential display frame to the next.

3. A method as recited in claim 1, wherein the associating step comprises associating a pair of the data framing bits with each individual group of data bits, the data framing bits within each pair having a predetermined binary relationship to each other.

4. A method as recited in claim 1, wherein the associating step comprises associating a pair of the data framing bits with each individual group of data bits, the data framing bits within each pair having a predetermined binary relationship to each other, wherein the method further comprises positioning the data framing bits of each pair in leading and trailing positions with respect to the associated individual groups of data bits; the data transmission line representing the leading framing bit within a particular display frame being written only after all of the other data transmission lines of the particular display frame have been written.

5. A method as recited in claim 1 wherein the associating step comprises associating a pair of the data framing bits with each individual group of data bits, the data framing bits within each pair having a predetermined binary relationship to each other, the method further comprising:
    optically monitoring the illumination of the sequentially-scanned data transmission lines of the sequential display frames to receive the individual groups of data bits and the associated data framing bits;
    discarding the data bits of a particular display frame if the bits of the data framing bit pair of the particular display frame do not have the predetermined binary relationship to each other.

6. A method as recited in claim 1 wherein the associating step comprises associating a pair of the data framing bits with each individual group of data bits, the data framing bits within each pair having a predetermined binary relationship to each other, the method further comprising:
    optically monitoring the illumination of the sequentially-scanned data transmission lines of the sequential display frames to receive the individual groups of data bits and the associated data framing bits;
    storing the data bits of a particular display frame if the bits of the data framing bit pair of the particular display frame have the predetermined binary relationship to each other;
    discarding the data bits of a particular display frame if the bits of the data framing bit pair of the particular display frame do not have the predetermined binary relationship to each other.

7. A method as recited in claim 1, wherein the associating step comprises associating a pair of the data framing bits with each individual group of data bits, the data framing bits within each pair being equal to each other.

8. A method as recited in claim 1, the wherein associating step comprises associating a pair of the data framing bits with each individual group of data bits, the data framing bits within each pair being opposite to each other.

9. A method as recited in claim 1, wherein:
    the associating step comprises associating only a single data framing bit with each group of data bits.

10. A method as recited in claim 1, wherein the associating step comprises associating only a single data framing bit with each group of data bits, the method further comprising positioning the single data framing bit of a particular group of data bits in a leading position with respect to that particular group of data bits.

11. A method as recited in claim 1, further comprising:
    associating consecutive frame numbers with the sequential display frames, each of the frame numbers being represented by a plurality of frame number bits;
    wherein the illuminating step includes selectively illuminating sequentially-scanned data transmission lines within each display frame to represent the frame number bits associated with that display frame.

12. A method as recited in claim 1, further comprising:
    associating consecutive frame numbers with the sequential display frames, each frame number being represented by a plurality of frame number bits;
    the illuminating step including selectively illuminating sequentially-scanned data transmission lines within each display frame to represent the frame number bits associated with that display frame;

optically monitoring the illumination of the sequentially-scanned data transmission lines of the sequential display frames to receive the individual groups of data bits, the associated data framing bits, and the consecutive frame numbers;

declaring a data reception error if the frame numbers are not consecutively received.

13. A method as recited in claim 1, further comprising:

optically monitoring the illumination of the sequentially-scanned data transmission lines of the sequential display frames to receive the individual groups of data bits and the associated data framing bits;

discarding data word bits from a particular display frame if the binary value of the at least one framing bit associated with the particular display frame's group of data bits has not changed.

14. A method as recited in claim 1, further comprising:

optically monitoring the illumination of the sequentially-scanned data transmission lines of the sequential display frames to receive the individual groups of data bits and the associated data framing bits;

discarding data word bits from a particular display frame if the binary value of the at least one framing bit associated with the particular display frame's group of data bits has not changed;

storing data word bits from a particular display frame if the binary value of the at least one framing bit associated with the particular display frame's group of data bits has changed.

15. A method of serially transmitting a sequence of data words, each of said data words comprising data word bits, the method comprising:

composing groups of display frame words, each of said display frame words comprising display frame word bits;

displaying sequential display frames on a frame-scanning graphics display device, the sequential display frames being associated with respective groups of display frame words;

providing at least one data framing bit in each respective group of display frame words;

positioning bits of the data words in the display frame words of the display frame word groups;

while displaying each of the sequential display frames, selectively illuminating sequentially-scanned data transmission display frame lines of the frame-scanning graphics display device to represent the bits of that display frame's associated display frame word group, wherein bits having a first binary value are represented by data transmission lines which are illuminated, and wherein bits having a second binary value are represented by data transmission lines which are not illuminated;

changing the binary values of the framing bits associated with the respective groups of display frame words from one sequential display frame to the next;

wherein the step of positioning data word bits further comprises interleaving the bits of the data words among a plurality of the display frame words to leave open bit positions for the data framing bits, individual data word bits being positioned at bit locations in the display frame words corresponding to the bit locations of said individual data word bits in the data words to allow the data words to be reconstructed from the display frame words with only minimal bit shifting.

16. A method as recited in claim 15 wherein the step of positioning data word bits comprises dividing the bits of a particular data word between at least two of the display frame words to leave open bit positions for the data framing bits.

17. A method as recited in claim 15, the step of positioning data word bits further comprising interleaving the bits of the data words among a plurality of the display frame words to leave open bit positions for the data framing bits.

18. A method as recited in claim 15, wherein the bit locations of said individual data word bits in the data words to allow the data words to be reconstructed from the display frame words without bit shifting.

19. A method as recited in claim 15, the method further comprising reconstructing the data words from the display frame words with only minimal bit shifting.

20. A method as recited in claim 15, further comprising positioning error indicating bits in the display frame words, said error indicating bits being derived from the data word bits positioned in the display frame word groups.

21. A method as recited in claim 15, further comprising:

deriving a single error indicating code from the data word bits of a plurality of the display frame word groups, said error indicating code comprising error indicating bits having binary values; and distributing the error indicating bits in the display frame words of said plurality of display frame word groups.

22. A method as recited in claim 15, wherein the displaying step comprises writing the sequentially-scanned data transmission lines of the sequential display frames to a frame buffer, the data transmission line representing one of the data framing bits associated with a particular group of display frame words being written only after all of the other data transmission lines of a particular display frame have been written.

* * * * *